(12) United States Patent
Chandrasekaran et al.

(10) Patent No.: US 7,627,726 B2
(45) Date of Patent: Dec. 1, 2009

(54) SYSTEMS AND METHODS FOR MANAGING CONTENT HAVING A RETENTION PERIOD ON A CONTENT ADDRESSABLE STORAGE SYSTEM

(75) Inventors: Venkat Chandrasekaran, Newark, CA (US); Razmik Abnous, Danville, CA (US)

(73) Assignee: EMC Corporation, Hopkinton, MA (US)

( * ) Notice: Subject to any disclaimer, the term of this patent is extended or adjusted under 35 U.S.C. 154(b) by 342 days.

(21) Appl. No.: 11/024,195

(22) Filed: Dec. 29, 2004

(65) Prior Publication Data

US 2006/0004689 A1 Jan. 5, 2006

Related U.S. Application Data

(60) Provisional application No. 60/584,765, filed on Jun. 30, 2004.

(51) Int. Cl.
*G06F 13/00* (2006.01)
(52) U.S. Cl. .............................. 711/159; 707/1; 707/10; 707/104.1; 711/6; 726/30
(58) Field of Classification Search ................ 711/108, 711/159, 6; 707/1, 10, 104.1; 726/30
See application file for complete search history.

(56) References Cited

U.S. PATENT DOCUMENTS

| | | | |
|---|---|---|---|
| 6,757,778 B1 * | 6/2004 | van Rietschote | 711/6 |
| 6,807,632 B1 | 10/2004 | Carpentier et al. | |
| 2003/0046270 A1 * | 3/2003 | Leung et al. | 707/1 |
| 2004/0030726 A1 * | 2/2004 | Baxter et al. | 707/104.1 |
| 2005/0125411 A1 * | 6/2005 | Kilian et al. | 707/10 |
| 2005/0160481 A1 * | 7/2005 | Todd et al. | 726/30 |
| 2005/0246311 A1 * | 11/2005 | Whelan et al. | 707/1 |

OTHER PUBLICATIONS

Lueth, Chris "WORM Storage on Magnetic Disks Using SnapLock Compliance and SnapLock Enterprise," Network Appliance, Inc. Technical Report 3263, Aug. 2004.
BearingPoint, Inc., "Achieving Federal Government Records Management Compliance with EMC Centera Compliance Edition (CE) Solutions," Jul. 31, 2003.

* cited by examiner

*Primary Examiner*—Tuan V Thai
*Assistant Examiner*—Yong Choe
(74) *Attorney, Agent, or Firm*—Van Pelt, Yi & James LLP

(57) ABSTRACT

A method for storing content on a storage system wherein the content is defined an associated retention period. The retention period prescribes a fixed amount of time that the content will be stored without the possibility of deletion. After the retention period expires, the content and all metadata associated with the content can be deleted from the storage system.

4 Claims, 6 Drawing Sheets

SYSTEMS AND METHODS FOR MANAGING CONTENT HAVING A RETENTION PERIOD ON A CONTENT ADDRESSABLE STORAGE SYSTEM

DESCRIPTION OF THE INVENTION

This application claims the benefit of priority of U.S. Provisional Application No. 60/584,765, filed Jun. 30, 2004, which is incorporated herein by reference.

FIELD OF THE INVENTION

The invention is related to the field of enterprise content management systems, and the software used to facilitate the storage of content within enterprise content management systems.

BACKGROUND OF THE INVENTION

Enterprise content exists in many forms, such as text documents, spreadsheets, images, e-mail messages, and fixed content such as schematics, records, and scanned images. The need has arisen for an enterprise to treat this content as resource: managing and leveraging content as an asset, and reducing its risks as a liability, and reducing its cost of storage. Moreover, compliance regulations are making it necessary to have rapid and easy accessibility to content. Companies in financial services, regulated industries, and governmental agencies are faced with complying with new and existing government regulations, wherein the need to access and supply files and records is imperative to avoid fines, or forced closures. In the wake of recent high profile accounting scandals and the passage of the Sarbanes-Oxley Act, all publicly traded U.S. companies are required to manage and archive content.

With the need to be able to access documents at any time, and from any location, many enterprises are using content management systems which employ storage servers for storing and archiving content. These content management systems allow for much more flexibility than traditional localized storage. Relationships between content can be established, allowing the same content to be used in multiple contexts and renditions. It allows content to be published through multiple channels. For example, the same content can be easily faxed, or published to a web site. More importantly, the content can be accessed by users who are either away from the office, or in a regional office on the other side of the globe.

Typically the storage servers employed by content management systems store content on traditional file system disk drives, optical storage, tape drives, or SAN or NAS systems. These systems do not offer much protection for the stored content, however, as they physically store content by a traditional file name hierarchy. Employees or hackers who wish to destroy content can locate the content by the file path, and then simply delete it. This has led to the adoption of storing content on write once, read many, or WORM, devices, which is non-magnetic, non-erasable media. However, with WORM devices, if it is no longer necessary to store content, the only way to destroy the content is to literally break the optical platter that is typically used for WORM storage.

U.S. Pat. No. 6,807,632 ('632 patent) proposes a solution to some of the shortcomings of the prior art storage systems. The '632 patent describes a method for content addressable storage, storage that relies on a content address for describing the physical location of content instead of file paths. Content addressable storage takes a piece of content and saves it in a storage server, typically a node comprised of magnetic disks. When the content is saved, the storage server returns a claim check, a content address, that identifies not only where the content is stored, but also other properties of the content, called metadata. The content metadata is digital assets of the content, such as the name, date created, date last accessed, author, permissions, etc. The returned content address is a cryptographic hash value, generally a string of characters, that is generated from the metadata and other assets of the content. This is then put into an XML document which stores the content address as well as a locator for a descriptor file which holds the "keys" to deciphering the hash. By storing the metadata along with the content, it is easy to verify the content, and determine other properties of the content simply by accessing the metadata. Furthermore, by having the location where the content is stored as part of the metadata, the content will always be able to be located without the user or administrator having to track the physical location of stored content.

A drawback to the system of the '632 patent is that there is no method for managing the retention of the content or metadata. For most content, it is only necessary for them to be archived for a set amount of time, after which, the content is no longer needed.

It is accordingly a primary object of the invention to implement a method for storing content on a storage system, wherein an administrator can set certain properties, or metadata, of the content, which will be persisted with the content when it is stored. The metadata is also associated with the content and stored in a relational database, allowing retrieval of the content by means of the associated metadata. One of the properties that is settable by the user is a retention date. This retention date defines a point in time, after which the content and all associated metadata may be deleted from the storage system.

This is achieved by using a storage object and abstraction in the form of a plugin library which is configured to pass the user-defined metadata, including the retention period, and the content to the storage system. The storage object and plugin library are configured to interface with a particular type of storage system, such that when a content management server identifies a storage object associated with a particular storage system, it loads the appropriate plugin library for passing the content and metadata to the particular storage system. This allows for storage on a variety of storage systems, including traditional disk storage, databases, and content addressable storage.

SUMMARY OF THE INVENTION

In accordance with the invention, herein is described a method for storing content with retention management properties on a storage system. The method comprises defining an object type for the content, associating user-defined object properties with the content, transmitting an object associating the object properties and the content to a content management server, selecting the storage system on which to store the content and object properties based on the object type, and transmitting the content and object properties to the selected storage system through a plugin configured to communicate with the selected storage system. The object type and plugin permit the implementation of user-defined storage policies, including a user-defined retention period, into the content stored in the storage system.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DESCRIPTION OF THE PREFERRED EMBODIMENT

Reference will now be made in detail to an exemplary embodiment of the invention, which is illustrated in the accompanying drawings. Wherever possible, the same reference numbers will be used throughout the drawings to refer to the same or like parts.

The following provides a system and method for storing content. While the preferred embodiment of the present invention is directed towards storing content in a content addressable storage system, further embodiments are within the scope of the invention that would allow content to be stored on other types of storage systems.

Figure 1A:
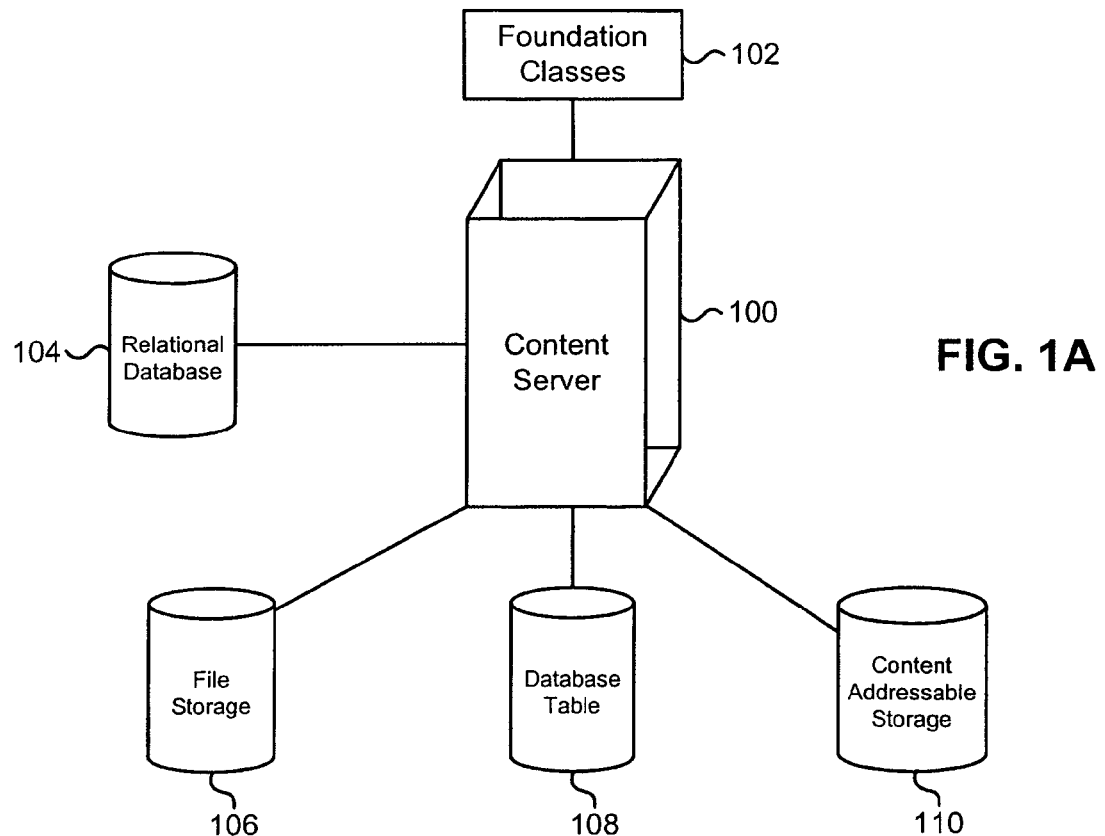
FIGS. 1A and 1B are diagrams illustrating a content addressable storage system consistent with the present invention.
Figure 1B:
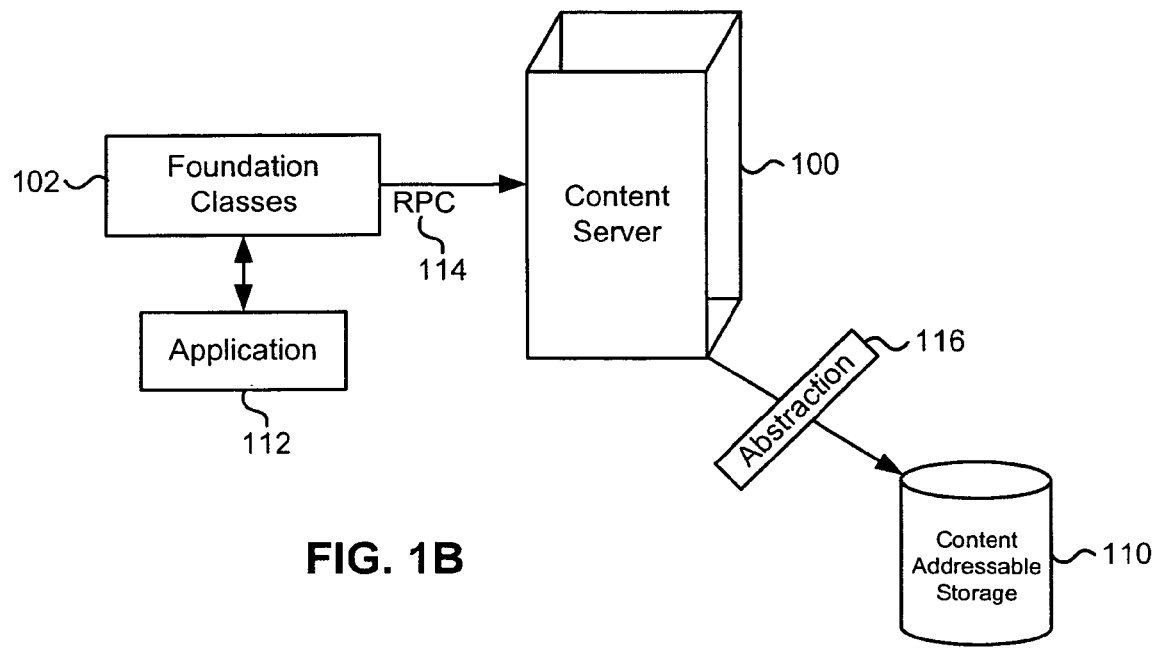

FIGS. 1A and 1B are diagrams illustrating a system for storing content on a content addressable storage system consistent with the present invention. As shown in FIG. 1B, an application 112 is in communication with a content management server, or content server 100 by a means of Remote Procedure Calls (RPC) 114. The application 112 is designed for content management, and is a tool used by the administrator of the content server to define storage policies for content on the content server. The storage policies are set in content objects that are created by the application 112, and are subsequently interpreted by the content server 100 to facilitate storing and retrieving content upon request. The application 112 has defined proprietary foundation classes 102 that are used for defining storage management through the content objects, and communicating with the content server.

The basic mechanism of the system operates such that when content is stored, the application 112 creates a content object for storing the content. The content object can be further described as a set of instructions that relate the actual content and any properties associated with the content, and further define the storage policies of the content. The application can set the content object as a storage object of a specific type, for storage in a specific type of storage system. The content object is streamed to the content server 100 and identifies the content object as being of a storage object type that correlates to a specific type of storage system. The content server 100 streams the content to a storage system, such as a database table 108, a file system storage or disk drive 106, or a content addressable storage system 110 through the use of an abstraction 116 which is designed for a specific storage system. The abstraction 116 is a plugin library, which can be in the form of a DLL or shared library that is configured to implement a specific interface to allow the content server 100 to be able to successfully pass the content and its associated object and storage properties to the storage system. When it is saved to a content addressable storage system 110, the content server 100 streams the content to the content addressable storage system 110, and the content addressable storage system 110 returns a content address to the content server 100. The content server 100 then stores the content address in the relational database 104.

One method and system for storing and accessing content on a content addressable storage system 110 is described above. An embodiment consistent with the present invention incorporates a unique storage object type and plugin library as an abstraction 116. The new storage object type has associated attributes, or object properties, that the user can define and which can be associated with the content that is being stored. The storage object comprises attributes whose values can define storage system specific parameters, metadata and retention policies. By allowing the user to modify or create a retention period, the user can set a date, after which, the archived content can be destroyed. For example, if the user wishes a document to remain archived for five years, the user can set this property, and after five years, the content can be destroyed. A user can also define a default retention period, wherein the content will be able to be destroyed after the default period, if the user does not define a different retention period.

Figure 2:
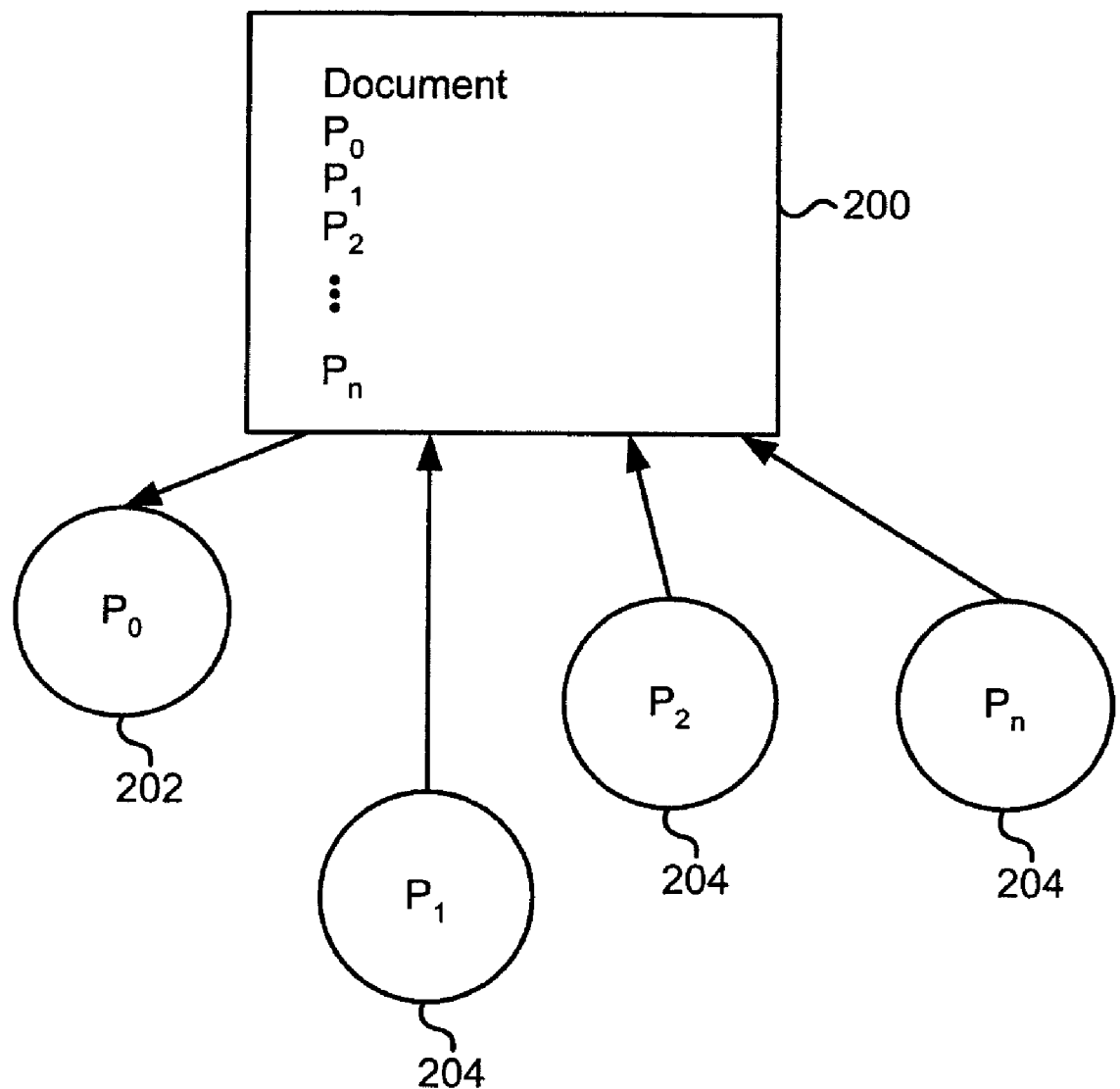
FIG. 2 is a diagram illustrating the relationship of content objects to document objects.

In one embodiment of the present invention enterprise users may save documents on a centralized server that allows for remote access and archiving. The documents typically are word processing documents, portable document files, e-mails, but can also be any other type of file. FIG. 2 is a diagram illustrating the relationship of content objects to document objects, consistent with the present invention. As shown in FIG. 2, when a document 200 is too large to be saved as a singular content object, the document is saved as pieces of content. For example, a large document could be stored as individual pages. To store the plurality of pieces of content, embodiments consistent with the present invention may create a plurality of content objects. Each content object may have an associated object ID that is assigned by the content server. The associated object ID allows the application to locate the content when it is stored in the storage system. The document, or parent object, points only to the primary content object 202, $P_0$, and all other secondary, or subcontent objects 204, $P_1, P_2 \ldots P_n$, point back to the parent object, that is, the stored document 200.

This method of storing content as primary content 202 and secondary or subcontent objects 204 also allows storage methods consistent with the present invention to associate a content object 200 with multiple content addresses. When the content associated with a content object 200 is originally saved to a content addressable storage system, the content address that is returned will be saved as an attribute of the primary content object 202. Each time the content object metadata is modified, the storage system returns a new content address. These subsequent content addresses are then saved as attributes of the subcontent objects 204. Thus, a subcontent object 204, will have saved many content address attributes, that point to the same document object 200.

Figure 3:
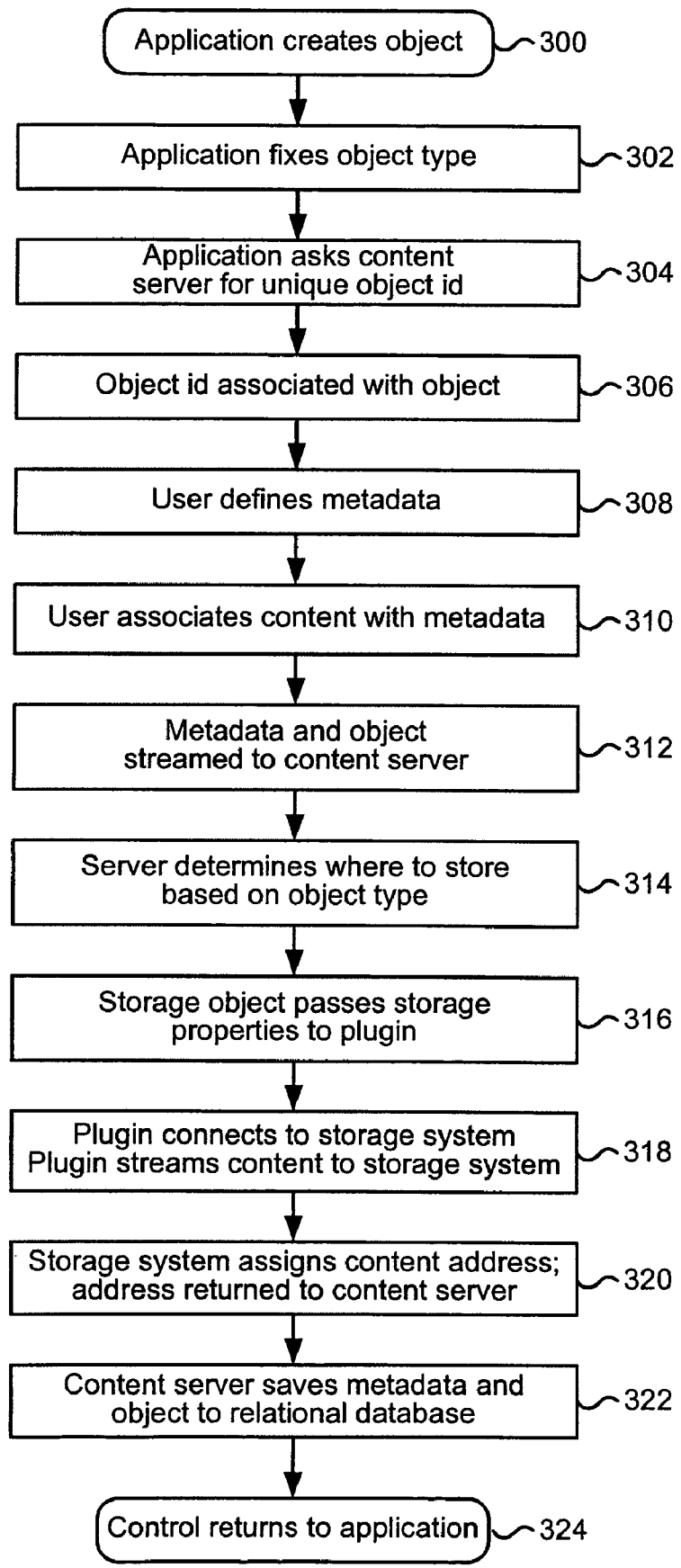
FIG. 3 is a flowchart illustrating the steps of a method for writing to a content addressable storage system consistent with the present invention.

An embodiment consistent with the present invention has the ability to write, read, update, and delete content on the storage system. FIG. 3 is a flowchart illustrating a process for writing to a content addressable storage system consistent with the present invention. As shown in FIG. 3, the process begins when the application creates a content object for storing content (step 300). The application fixes the storage object type that defines how the content will be stored (step 302). Typically, content can be stored as a storage object type that is associated with the storage system on which the content will be stored, such as, a file system or disk drive storage, a database table storage, or a content addressable storage system. In this case, the storage object type will be fixed as a storage object type consistent with an embodiment of the present invention, which will be stored on a content addressable storage system.

The application may begin to communicate with the content server by asking for an unique object ID (step 304). This unique object ID is associated with the content object, and the ID is persisted in the memory of the application (step 306). Next, the user is able to define object properties of the storage object (step 308). The object properties, or metadata, of a content object of the storage object type may include the retention period for the content being stored. The user then associates the content with the metadata (step 310). The content can either be new content created by an end user, or existing content that is already present on an end user's computer that has been marked for archival. The content will be passed from the end user's computer to the content server where the metadata is associated with the content. By associating the defined metadata with the content, the content server will be passed instructions for storing and retrieving the content on the storage system.

The application streams the storage object, with the content-associated metadata, to the content server (step 312). The content server determines where the content will be stored by, for example, determining the storage object type that was fixed by the application (step 314). The associated storage object passes properties of the content, the metadata, to the plugin (step 314). The plugin connects with the storage system and streams the content and metadata to the storage system (step 318). The plugin includes specific application program interfaces (APIs) to the type of storage system, configured to allow the metadata to be set, and a retention period to be defined, such that they are stored on the storage system. The content and the metadata that are streamed to the storage system will be persisted in the storage system. At this point, the content server may analyze the metadata to determine if any component of the metadata requires interpretation. For example, if the user set a retention period for the content, the content server may interpret the retention period set by the user and translate the period into a number of seconds since the creation date of the content, which may be added to the metadata and persisted in the relational database with the content object. The number of seconds may be used for comparison with the number of seconds elapsed since creation of the content on, for example, a delete call, to determine whether the period has expired. As the storage system saves the content and metadata, the storage system returns a content address to the content server, through the plugin (step 320). The content address is added as an attribute to the content object, which may be passed to and persisted in a relational database. After the content object and metadata are saved in the relational database (step 322), the application regains control of the content (step 324).

Figure 4:
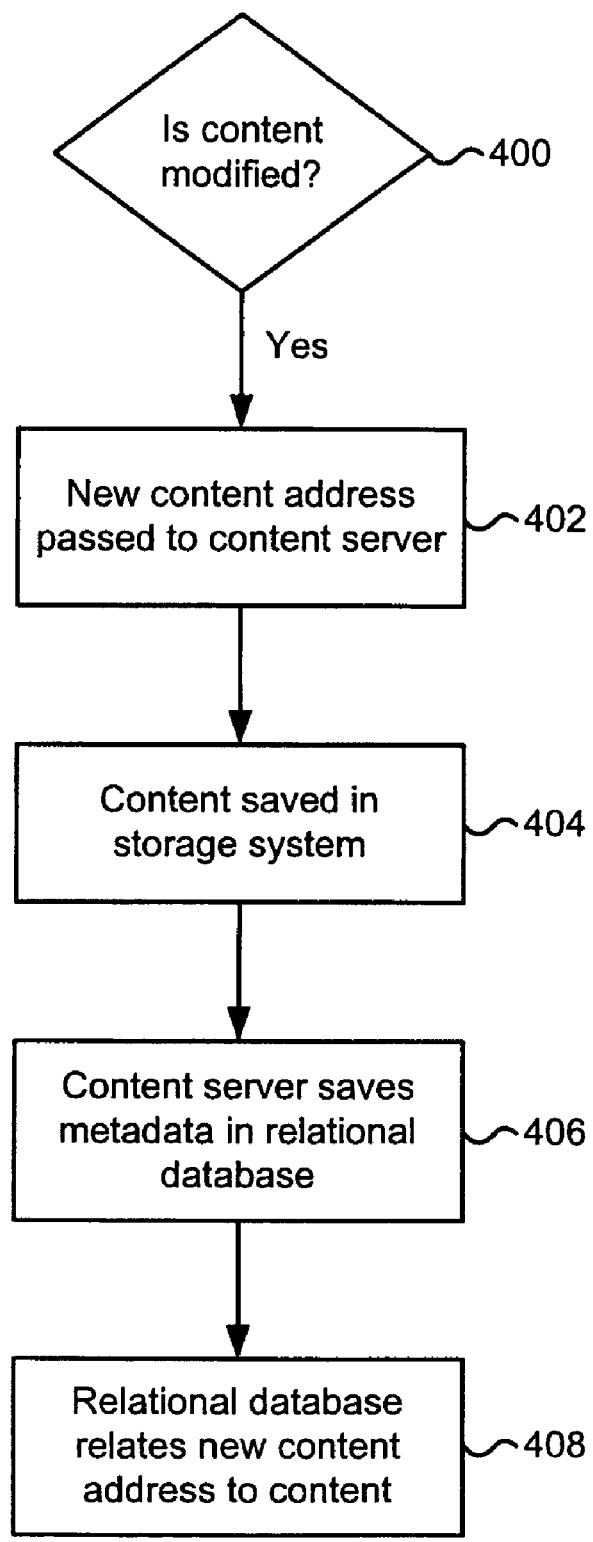
FIG. 4 is a flowchart illustrating the modification of the write process of FIG. 3 when content metadata has been modified consistent with the present invention.

The ability to modify the metadata of content consistent with the present invention provides flexibility and adaptability in enterprise content management. For example, if a user originally sets a regulation-mandated retention period of 5 years, but, two years later, regulations change, and it is necessary to retain documents for 10 years, the user will need to modify the retention period. Modifying metadata values may be performed by the write process above, by simply defining the modified, or new, object properties, and associating these new properties with the content. However, when content is saved to the storage system, the metadata values are not compared to the original metadata values associated with the content, so even if none of the metadata values have been changed, the storage system cannot make the distinction, regards it as a successful save of content, and returns a new content address. FIG. 4 is a flowchart illustrating the modification of the write process of FIG. 3 when content metadata has been modified consistent with the present invention. As shown in FIG. 4, if the content is modified (step 400), the storage system passes a new content address to the content server (step 402) as the content is saved in the storage system (step 404). The new content address is passed with the rest of the metadata to the relational database (step 406), wherein the new content address is related to the original content (step 408). A single content object can be related to multiple content addresses, indicating multiple modifications of the content metadata, however, on each successive call for the content object, only the last content address returned from the storage system content address is used.

Figure 5:
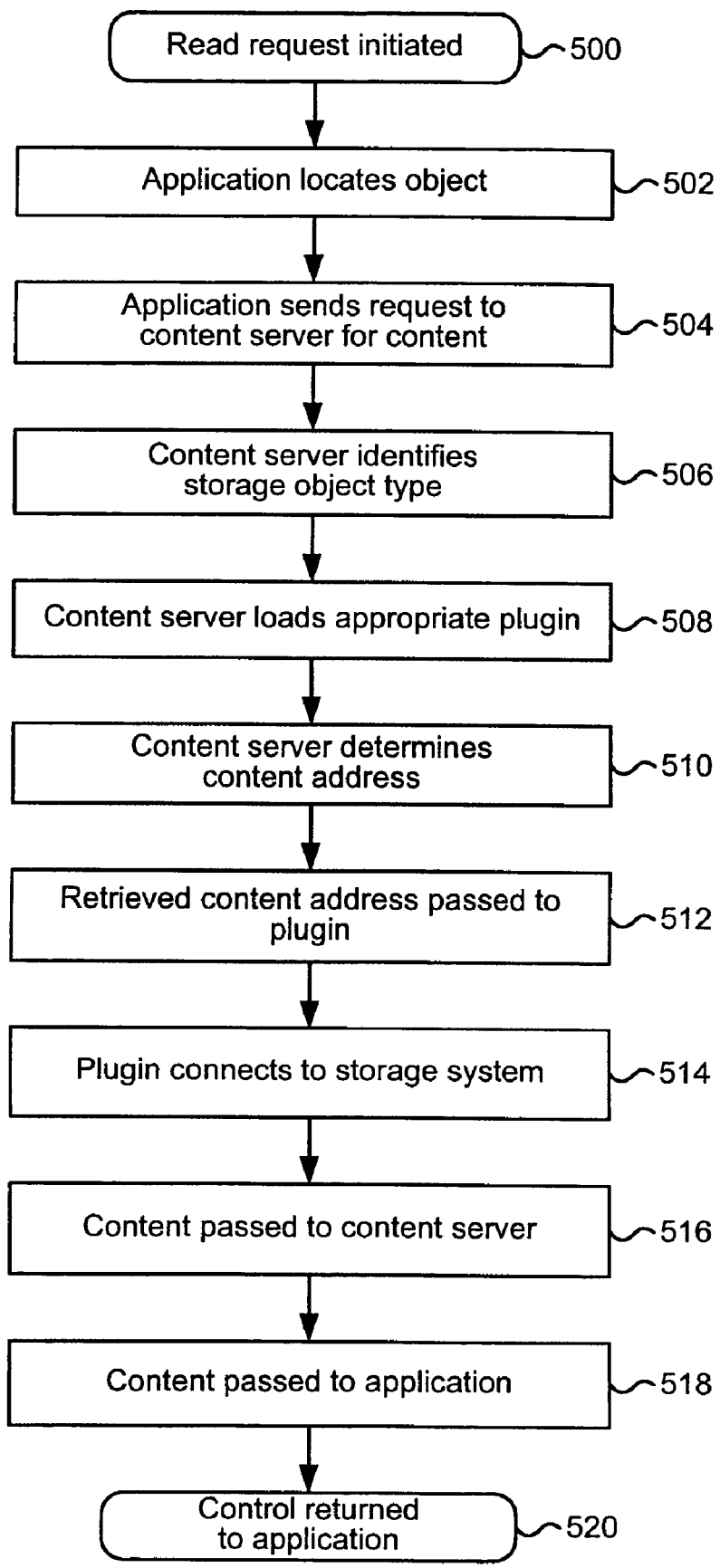
FIG. 5 is a flowchart illustrating the steps of a method for reading content from a content addressable storage system consistent with the present invention.

FIG. 5 is a flowchart illustrating the steps of a method for reading content from a content addressable storage system consistent with the present invention. As shown in FIG. 5, when the application initiates a read request (step 500), the application locates the content object by, for example, the name or the unique object ID that was associated with the content when it was first stored (step 502). If the name or ID is unknown, the user can perform a text search to find the desired name or ID. The search may be a search of the relational database, or of the object IDs that are persisted in the application's memory. However, the user is only able to view results for content for which it has at least view permission. The application subsequently sends a request to the content server for the content object (step 504). The content server identifies the storage object type (step 506), and loads the appropriate plugin for communicating with the storage system for the identified storage object type (step 508). From the object ID or name, the content server may retrieve the metadata associated with the content object of that name or ID from the relational database. The metadata includes, for example, the content address of the content. Thus, when the content server retrieves the metadata from the relational database, the content server is able to determine the content address from the metadata (step 510). If the content object has multiple content addresses, only the most recently returned content address is retrieved. The retrieved content address is passed to the plugin (step 512), and the plugin connects with the storage system (step 514). The content associated with the content address is subsequently passed back to the content server (step 516). The content server may then pass the content to the application (step 518). Control of the content is then passed to the application (step 520).

Figure 6:
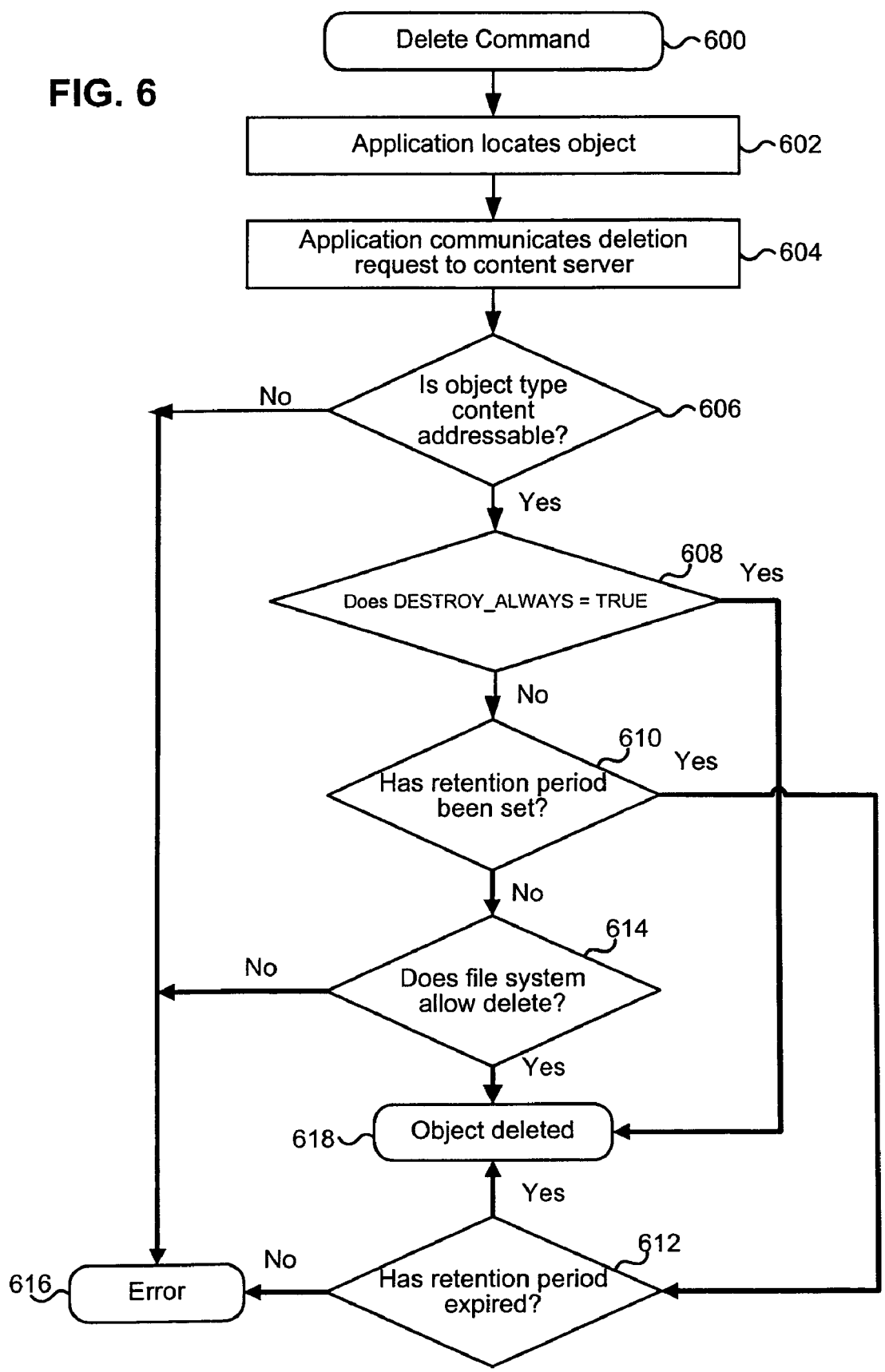
FIG. 6 is a flowchart illustrating the steps of a method for deleting content from a content addressable storage system consistent with the present invention.

FIG. 6 is a flowchart illustrating the steps of a method for deleting content from a content addressable storage system consistent with the present invention. When the delete command is initiated (step 600), the application locates the content by, for example, the name or the unique object ID that was associated with the content when it was first stored (step 602). If the name or ID is unknown, the user can perform a text search to find the desired name or ID. The search may be a search of the relational database, or of the object IDs that are persisted in the application's memory. The application communicates a request to the content server to delete the identified content (step 604). The content server performs a series of checks on the content object to ensure that a deletion is authorized. The content server first determines if the storage object type originally fixed by the application is one that is designed for storage on a content addressable storage system (step 606). If the storage object type is designed for storage on a content addressable storage system, the checks will proceed, otherwise an error will be returned (step 616). In one embodiment consistent with the present invention, the function in the plugin library that handles deletions has an attribute flag DESTROY_ALWAYS which can be set, for example, to TRUE or FALSE, or YES or NO, or 1 or 0. The process checks to see if the attribute flag DESTROY_ALWAYS has been set to a positive indicator, for example, TRUE (step 608). If it has been set to, for example, TRUE, the content will be deleted without performing further checks (step 618). If it has been set to, for example, FALSE, the process will check to see if a retention period has been set by the user (step 610). If a retention period has been set, the content server skips other checks and determines whether the retention period has expired (step 612). If the retention period has not expired, the object will check to determine whether the underlying file system allows deletions (step 614). If a retention period has been set, and has expired, the object will be deleted regardless of whether the underlying file system allows deletions (step 618). For cases when the retention period has not expired, or the file system does not allow deletions, an error is returned (step 616).

If the content has multiple content addresses associated with it, either from modified metadata or content stored as multiple pieces of content as described in FIG. 2, the content server will check the retention periods of all of the content addresses associated with the content. The process will return an error at the first content address that has not expired. If all content addresses have expired, the content is deleted.

Deleting content has the effect of not only destroying the content on the storage system, but also all associated content objects and metadata, including content addresses, stored in the relational database. Using FIG. 2 as an example, if a user wishes to delete a large piece of content, for example a document 200, the content server unlinks all associated content objects 202, 204 from the document object 200. The result is that the content objects 202, 204 are no longer pointing to the deleted parent document object 200. If the content objects 204 are no longer pointing to any parent document objects 200, or there are not any parent objects 200 pointing to the content objects 202, they are marked for deletion and are subsequently destroyed. The content is subsequently destroyed on the storage system when the content server calls a delete function contained in the plugin that may instruct the storage system to physically clean the sectors where the content is stored, ensuring that the content is unrecoverable.

Although the preferred embodiment is designed for use in a content addressable storage system, the storage object type and abstraction can be modified or adapted such that they will allow the definition of metadata and a retention period on many types of storage systems. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for storing content with retention management properties on at least one of a plurality of storage systems, the method comprising:
    creating a content object for the content;
    defining an object type for the content object, the object type defining how the content will be stored, and on which of the plurality of storage systems the content will be stored;
    defining object properties for the content;
    transmitting the content object, including the content and the object properties, to a content management server, wherein:
    the content management server selects at least one storage system from the plurality of storage systems on which to store the content object based on the content object type;
    the content management server associates the object properties, including a retention period, with the content;
    the content management server determines a plugin configured to communicate with the selected storage system;
    the content management server transmits the content and object properties to the selected storage system through the determined plugin, wherein the determined plugin comprises specific application program interfaces to the selected storage system, configured to allow the object properties to be set including the retention period to be defined, such that they are stored on the selected storage system; and
    the content management server stores the object properties including the retention period in a relational database.

2. The method of claim 1, wherein:
    the selected storage system is a content addressable storage system.

3. The method of claim 2, wherein:
    the content addressable storage system returns a content address for the content and object properties to the content management server; and
    the content management server associates the content address with the content and object properties and stores the associated content address in the database.

4. The method of claim 1, wherein:
    the content can be deleted when the retention period expires.

* * * * *